(12) United States Patent
Prince

(10) Patent No.: US 12,053,903 B2
(45) Date of Patent: Aug. 6, 2024

(54) ROUTER JIG

(71) Applicant: Paul Prince, Grimsby (GB)

(72) Inventor: Paul Prince, Grimsby (GB)

(*) Notice: Subject to any disclaimer, the term of this patent is extended or adjusted under 35 U.S.C. 154(b) by 778 days.

(21) Appl. No.: 16/973,522

(22) PCT Filed: Jun. 4, 2019

(86) PCT No.: PCT/GB2019/051539
§ 371 (c)(1),
(2) Date: Dec. 9, 2020

(87) PCT Pub. No.: WO2020/016549
PCT Pub. Date: Jan. 23, 2020

(65) Prior Publication Data
US 2021/0237305 A1    Aug. 5, 2021

(30) Foreign Application Priority Data

Jul. 16, 2018 (GB) ..................... 1811637

(51) Int. Cl.
*B27C 5/10* (2006.01)
*B23Q 9/00* (2006.01)

(52) U.S. Cl.
CPC .............. *B27C 5/10* (2013.01); *B23Q 9/0042* (2013.01)

(58) Field of Classification Search
CPC ...................................................... B27C 5/10
USPC ..................................................... 144/134.1
See application file for complete search history.

(56) References Cited

U.S. PATENT DOCUMENTS

| 3,782,431 | A |  | 1/1974 | Cox |  |
|---|---|---|---|---|---|
| 4,813,826 | A | * | 3/1989 | Riedel | B27F 5/12 33/197 |
| 5,148,730 | A | * | 9/1992 | McCaw | B23Q 9/0042 83/522.18 |
| 6,134,800 | A | * | 10/2000 | Newman | B23Q 9/0042 144/144.51 |
| 6,176,281 | B1 |  | 1/2001 | Newman |  |
| 6,705,810 | B1 | * | 3/2004 | Sugita | B23Q 9/0014 144/137 |

FOREIGN PATENT DOCUMENTS

GB    2441749    3/2008

OTHER PUBLICATIONS

International Search Report dated Aug. 19, 2019 issued in PCT International Patent Application No. PCT/GB2019/051539, 2 pp.
(Continued)

*Primary Examiner* — Bobby Yeonjin Kim
(74) *Attorney, Agent, or Firm* — NIXON & VANDERHYE P.C.

(57) ABSTRACT

A routing jig for enabling location of router guides prior to routing a feature into a workpiece includes a transparent or semi-transparent base component having longitudinal sides, a lower surface and an upper surface. The routing jig also includes retaining structure such as side bars and screws. The base component and the retaining structure together define a nominal width of the routing jig in a transverse direction. A plurality of shims are selectively and removably securable to the longitudinal sides of the base component by the retaining structure, thereby to increase the nominal width of the routing jig.

15 Claims, 9 Drawing Sheets

(56) References Cited

OTHER PUBLICATIONS

Great Britain Search Report dated Jan. 15, 2019 issued in Great Britain Patent Application No. 1811637.6, 4 pp.
Rockler, Jun. 22, 2008, Amazon, [online], Available from: https://www.amazon.com/Router-Table-Jointing-Shims-Pack/dp/B001DT3356, Jan. 9, 2019, 7 pp.

* cited by examiner

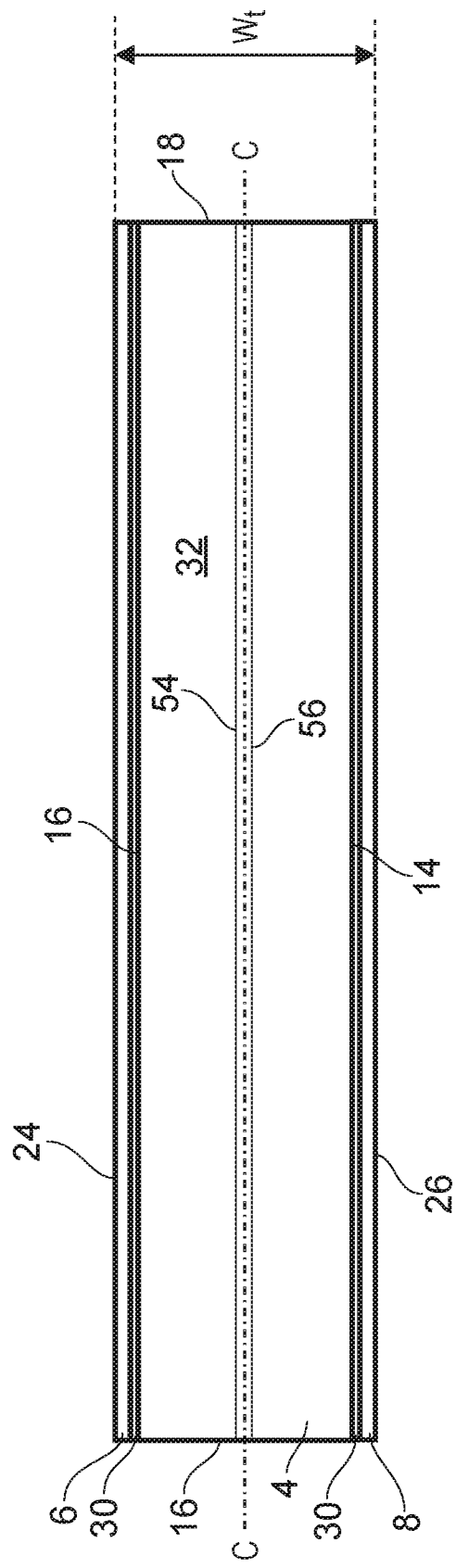

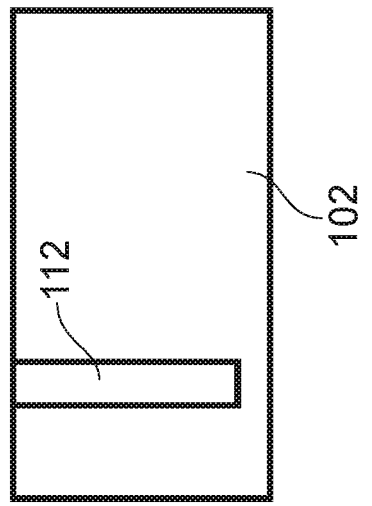
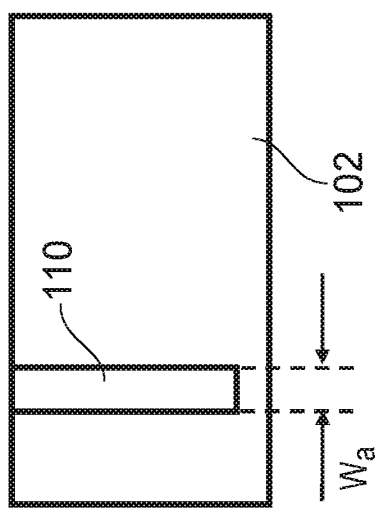
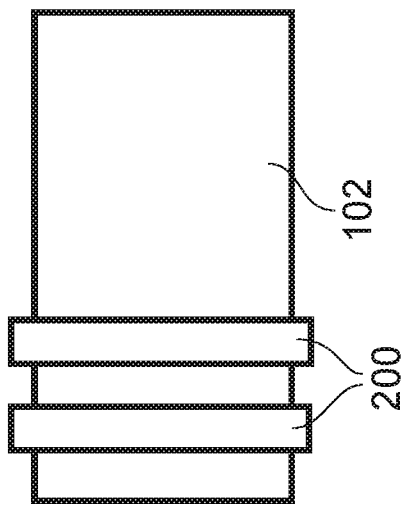

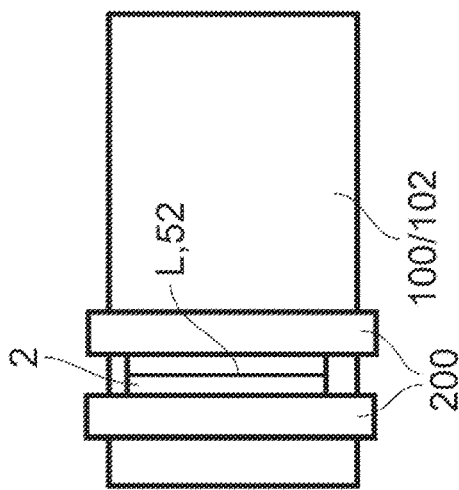
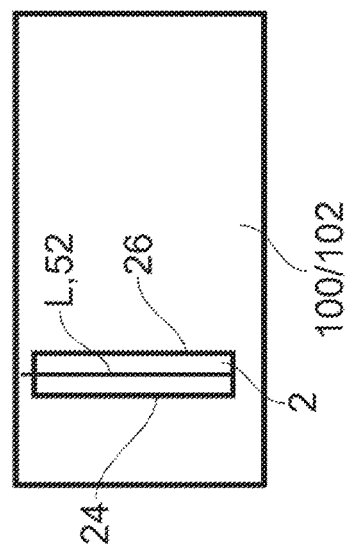
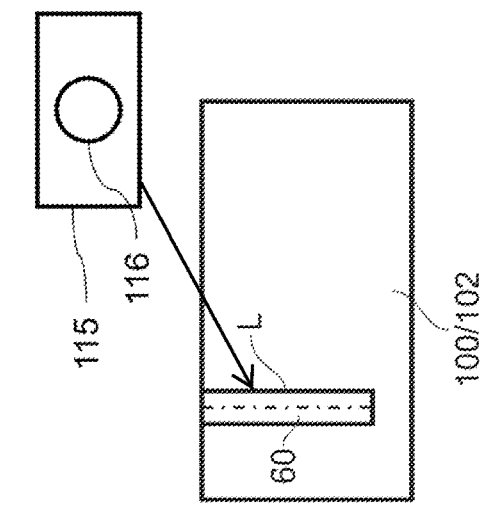
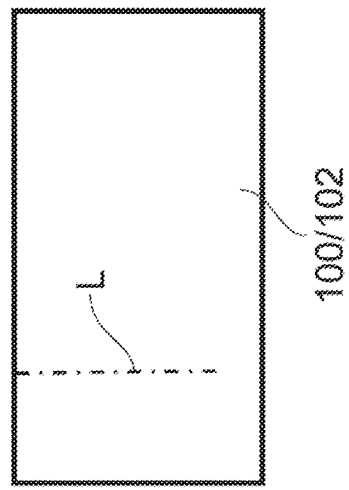
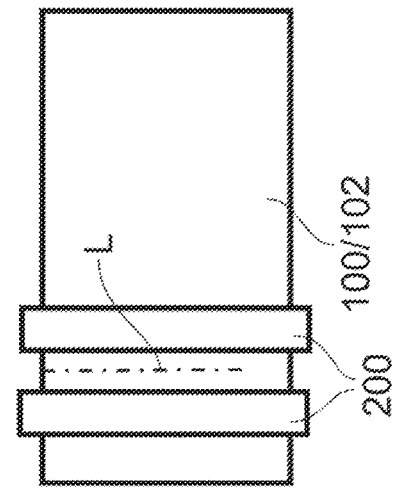

| Shim Colour | Shim width (inches) | Shim width (mm) |
|---|---|---|
| Purple | 0.001 | 0.0254 |
| Pink | 0.0015 | 0.0381 |
| Dark Blue | 0.002 | 0.0508 |
| Green | 0.003 | 0.0762 |
| Amber | 0.004 | 0.1016 |
| Brown | 0.005 | 0.127 |
| White | 0.010 | 0.254 |
| Yellow | 0.020 | 0.508 |
| Tan | 0.040 | 1.016 |

FIG. 12

ROUTER JIG

This application is the U.S. national phase of International Application No. PCT/GB2019/051539 filed Jun. 4, 2019 which designated the U.S. and claims priority to Great Britain Patent Application No. 1811637.6 filed Jul. 16, 2018, the entire contents of each of which are hereby incorporated by reference.

The present invention relates to a jig, and specifically to a routing jig for enabling location of router guides prior to routing a feature into a workpiece.

Routing jigs are used to locate guides that guide a router, such as a woodworking router, when machining a feature into a workpiece in a required manner and at a required location.

The accuracy of placement of a routing jig, and any associated routing guides, is important to ensure that an eventual machined feature is accurately placed. Furthermore, it is important to ensure that a router machines a feature with the required dimensions, such as width. If a mating component is to be inserted into a machined feature, the tolerance between the mating component and the machined feature must provide the required fit. A purely mechanical fit will require the width of the machined feature to be close to the width of the mating component, however if adhesive is to be used to hold the mating component in place, a looser fit between the components could be required.

Furthermore, prior art routing procedures can suffer a loss of accuracy of machined feature placement and width due to eccentricity of the routing cutter. Cutter eccentricity can be caused by, for example, router cutter, collet or spindle nose 'run out', due to router bit, collet or spindle manufacturing tolerances, bearing 'run out' due to manufacturing tolerances or bearing wear, and light corrosion/debris in any of the above machined interfaces, for example due to poor router maintenance.

It is an object of the present invention to provide an improved routing jig, and methods of calibrating and using the routing jig, to enable an improved placement of router guides, and to compensate for dimensional errors.

Accordingly the present invention provides a routing jig comprising; a base component having longitudinal sides, a lower surface and an upper surface; retaining means, wherein the base component and the retaining means together define a nominal width of the routing jig in a transverse direction; and a plurality of shims, wherein the shims are selectively and removably securable to the longitudinal sides of the base component by the retaining means, thereby to increase the nominal width of the routing jig.

The base component may comprise an optical alignment bar at least partially formed of a transparent or semi-transparent material. The optical alignment bar may further comprise an indication means on the lower surface, wherein the indication means is visible through the upper surface of the optical alignment bar.

The indication means may comprises an indication line which extends along a central longitudinal axis of the optical alignment bar.

Alternatively, the indication means may comprise a first indication line and a second indication line, wherein the first and second indication lines are parallel to the central longitudinal axis of the optical alignment bar, and wherein the first indication line is defined on one side of the central longitudinal axis, and the second indication line is defined on the opposite side of the central longitudinal axis; and wherein the indication lines are each offset from the central longitudinal axis by an equal distance.

The first indication line and the second indication line are both coloured entirely in the same colour. Alternatively, the first indication line and the second indication line each comprise one or more sections coloured in a first colour, and one or more sections coloured in a second colour; wherein the sections of the first colour of the first indication line are longitudinally aligned with the sections of the first colour of the second indication line, and the sections of the second colour of the first indication line are longitudinally aligned with the sections of the second colour of the second indication line.

The retaining means may comprise side plates; wherein a first side plate is releasably coupleable to a first longitudinal side of the base component, and a second side plate is releasable coupleable to a second longitudinal side of the base component, and wherein the shims are selectively and releasably attachable to the routing jig between the base component and each side plate.

The retaining means may further comprise either: countersunk screws which each extend through a countersunk aperture in a side plate and into the base component; or cheesehead screws which extend through a counterbored aperture in a side plate and into the base component.

Additionally, the shims may each comprise apertures through which the screws also extend.

The present invention also comprises a set of shims for use with the routing jig as claimed in any one of the preceding claims, comprising pairs of shims, each of the shims in a pair having an identical width in the transverse direction.

The present invention also comprises a method of assembling a routing jig as above, the method comprising; (i) locating a first selection of one or more shims against a first longitudinal side of the base component; (ii) locating a second selection of one or more shims against a second longitudinal side of the base component; and (iii) securing, by the retaining means, the first and second selections of one or more shims on the base component.

The first selection and the second selection are preferably identical in overall width in the transverse direction.

The present invention further comprises a method of removing material from a workpiece using a router to create a machined feature, the method comprising; (i) assembling a router jig as above; (ii) positioning the router jig on the workpiece such that the lower face of the router jig is in contact with the workpiece and the indication means is aligned with a central axis of a feature to be machined; (iii) positioning and securing a first guide to the workpiece such that the first guide abuts a first longitudinal side of the assembled routing jig; (iv) positioning and securing a second guide to the workpiece such that the second guide abuts a second longitudinal side of the assembled routing jig; (v) removing the routing jig from between the first and second guides; and (vi) using the router to remove material from the workpiece between the guides.

The method may further comprise, prior to step (i); (a) placing and securing the first and second guides to a test piece of workpiece; (b) using the router to make a test cut in the test piece of workpiece; (c) measuring the width, in a transverse direction, of the test cut; and (d) using the width measurement of the test cut to determine the first and second selection of shims to achieve a required total width of the machined feature.

The present invention also comprises a calibration process, which is performed prior to a method as above, the calibration process comprising; (1) assembling the retaining means directly onto the longitudinal sides of the base component; (2) positioning the assembled router jig onto a test piece of workpiece such that the lower face of the router jig is in contact with the workpiece and the indication means is aligned with a central axis of a feature to be machined; (3) positioning and securing a first guide to the test piece of workpiece such that the first guide abuts a first longitudinal side of the assembled routing jig; (4) positioning and securing a second guide to the test piece of workpiece such that the second guide abuts a second longitudinal side of the assembled routing jig; (5) removing the routing jig from between the first and second guide thereby leaving a slot between the first and second guides; (6) test fitting a router fitted with a guide bush having a known nominal diameter equal to the nominal width of the router jig into the slot; and if the guide bush is good slide fit in the slot, determining that the calibration process is over; if the guide bush is not a good slide fit in the slot, removing the guides from the test piece, disassembling the routing jig and reassembling with one or more shims secured to the routing jig, and repeating steps (2) to (6) until the guide bush is a good slide fit into the slot.

The routing jig of present invention enables a process of removal of material from a workpiece with a substantially increased level of accuracy, of both position and width, of a machined feature compared to prior art routing jigs.

With the present invention, the risk of parallax error is avoided, as indication means are immediately adjacent to the workpiece to be machined. Furthermore, there is no risk of machining on the incorrect side of a line indicated on workpiece, as all machining is relative to the centre line of the feature and the jig.

The routing jig can be used to enable a machining process for providing a feature, for example, a slot, groove, dado, trench, sliding dovetail, mortise, 'T' slot track, or a groove for an inlay, in a workpiece. It can allow a router fitted with a metric-dimensioned router bit to accurately machine an imperial-dimensioned feature, or conversely can allow an imperial-dimensioned router bit to accurately machine a metric-dimensioned feature. The routing jig can also enable the use of a router fitted with one-off/custom, undersize or reground router bits for machining metric or imperial dimensioned features. Features can be machined to any length and at any angle, for example from dead square to parallel. The machining action may be 'stopped', i.e. only extend partially along a dimension of the workpiece, or 'through', i.e. extend fully along a dimension of the workpiece.

The present invention also provides an automatic compensation for any oversize cutting due to router cutter eccentricity.

The routing jig of the present invention can be used with, for example, plunge or fixed based routers, for example a router fitted with an industry standard 30 mm diameter guide bush. The width of a machined feature can be adjusted in small increments, for example in 0.001 inch (25.4 μm) increments, to achieve a tight fit for mating components, or to provide a predetermined tolerance to allow for adhesive to be applied into a machined feature.

The present invention can enable a feature to be machined having a maximum width determined by a known internal diameter of a router guide bush. For example, when used with an industry standard 30 mm router guide bush, a maximum width of cut achievable would be approximately 22-24 mm. If a large cut, for example over 24 mm, was required to be made, a larger routing jig kit could be utilised.

The present invention will now be described by way of example only with reference to the accompanying figures in which:

FIG. 9 is a top plan view of the jig of FIG. 8 assembled;

FIGS. 10a to 10c are schematic representations of stages of making test cuts in a workpiece prior to using a jig in accordance with the present invention;

FIGS. 11a to 11e are schematic representations of stages of using a jig in accordance with the present invention; and FIG. 12 is an example of a key for colour-coded shims in accordance with the present invention.

Figure 1:
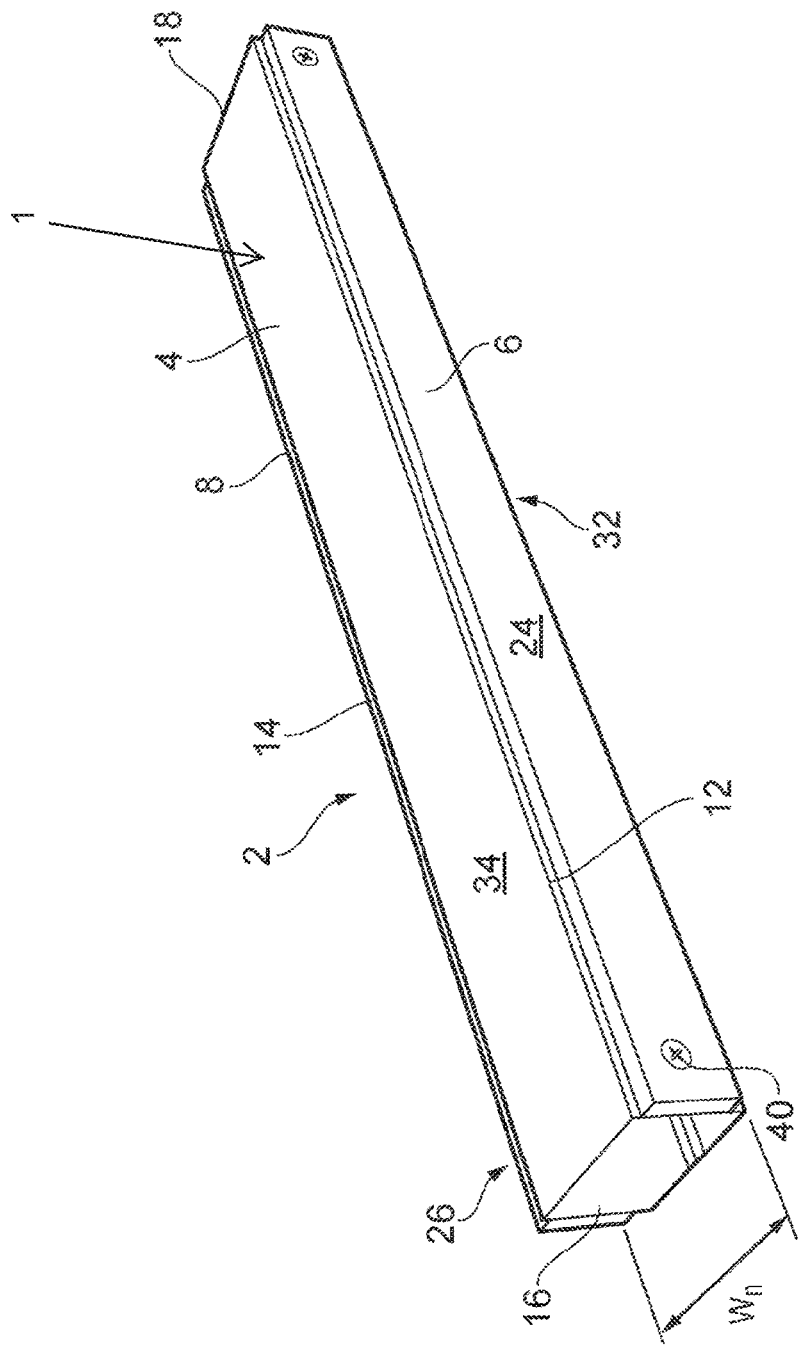
FIG. 1 is an isometric view of a assembled routing jig in accordance with an embodiment of the present invention without shims.

In the following description, a "machined feature" or "feature" is to be understood as any feature resulting from removal or material from a workpiece, for example, a groove, slot, dado, trench, sliding dovetail, mortise, 'T' slot track, or a groove for an inlay, etc., or a combination of features.

Furthermore, references to width or thickness are to be understood to refer to a dimension in a transverse direction, as described below.

With reference to the figures, apparatus in accordance with the present invention comprises a routing jig 2 comprising a base component 1 in the form of an optical alignment bar 4, retaining means, and a plurality of shim plates or shims 30, which are removably securable to the base component 1 by the retaining means.

The retaining means comprises countersunk screws 40, and keeper plates/side plates, comprising a first side plate 6 and a second side plate 8. One or more shims 30 can be removably secured to the routing jig 2 between the optical alignment bar 4 and the side plates 6, 8 as described below.

The optical alignment bar 4 is an elongate component, extending in a longitudinal direction, defined by the X axis, and in a transverse direction, defined by the Y axis (the transverse axis Y being orthogonal to the longitudinal axis X).

The optical alignment bar 4 comprises a first longitudinal side 12, a second longitudinal side 14 opposing the first longitudinal side 12, a first end 16 and a second end 18. A lower, workpiece facing surface 32, and an upper, non-workpiece facing surface 34, extend between the first and second longitudinal sides 12, 14.

The optical alignment bar 4 is at least partially formed of a transparent or semi-transparent material such that a user may view a workpiece through the bar 4, as further described below. The side plates 6, 8 are formed of a rigid material such as steel.

Countersunk apertures 22 are provided in the side plates 6, 8, and threaded inserts 20 are provided in longitudinal sides 12, 14 of the optical alignment bar 4. The side plates 6, 8 are removably fixable to the optical alignment bar 4 by the screws 40. Specifically, the first side plate 6 is removably fixable to the first longitudinal side 12 of the optical alignment bar 4 by screws 40 inserted into the countersunk apertures 22 in the first side plate 6 and then into the correspondingly placed threaded inserts 20 in the optical alignment bar 4, and similarly, the second side plate 8 is removably fixable to the second longitudinal side 14 of the optical alignment bar 4 by screws 40 inserted into the countersunk apertures 22 in the second side plate 8 and the correspondingly placed threaded inserts 20 in the optical alignment bar 4.

The optical alignment bar 4 is provided with indication means on the workpiece facing, lower surface 32, wherein the indication means is visible by a user, through the non-workpiece facing, upper surface 34 of the bar 4.

In the illustrated embodiment, the indication means comprises a narrow gap 52 between two longitudinally-extending indication lines 54, 56 which are applied to, or engraved upon the lower surface 32 of the optical alignment bar 4. The two indication lines 54, 56, and therefore also the gap 52 therebetween, extend parallel to a longitudinal central axis C of the lower surface 32 of the optical alignment bar 4. The indication lines 54, 56 are provided on opposite sides of the longitudinal central axis C, and are each offset from the longitudinal central axis C by an equal distance.

The gap 52 between the two indication lines 54, 56 is narrow (the gap 52 has been exaggerated in the figures for illustration only); for example it is preferably close in width to that of a centre line L which will be marked on the workpiece 100, as described below. A preferred gap width could be, for example, 0.7 mm, if a 0.5 mm pencil was to be used to mark the centre line L of the feature to be machined (as further explained below).

As explained below, the provision of an indication line 54, 56 on each side of the longitudinal central axis C, and the gap 52 therebetween, provides enhanced accuracy of placement of the routing jig 2. Furthermore, the two indication lines 54, 56 could be provided in a selected colour to ensure that they are clearly visible to a user through the optical alignment bar 4 when the jig 2 is placed on a particular colour workpiece. For example, if the jig 2 was to be used on dark-coloured workpieces, an optical alignment bar 4 having indication lines 54, 56 both entirely of a light colour such as white could be selected, and if the jig 2 was to be used on light-coloured workpieces, an optical alignment bar 4 having indication lines 54, 56 both entirely of dark colour such as black could be selected.

Figure 2:
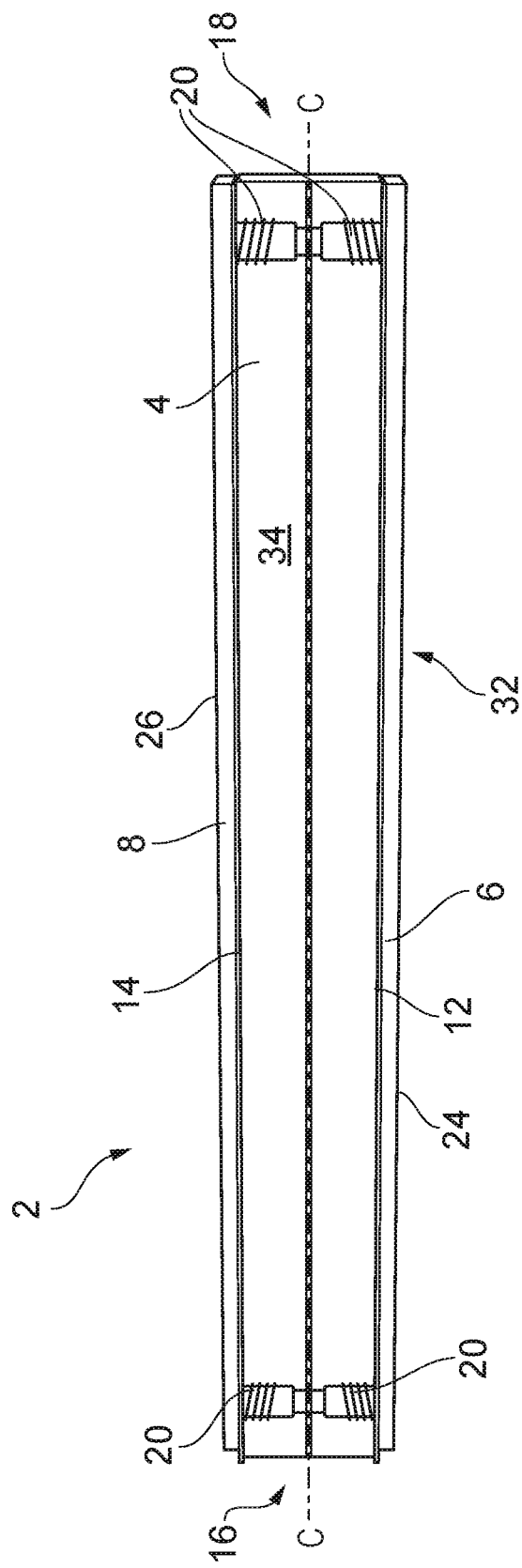
FIG. 2 is a top view of the routing jig of FIG. 1 without shims.
Figure 3:
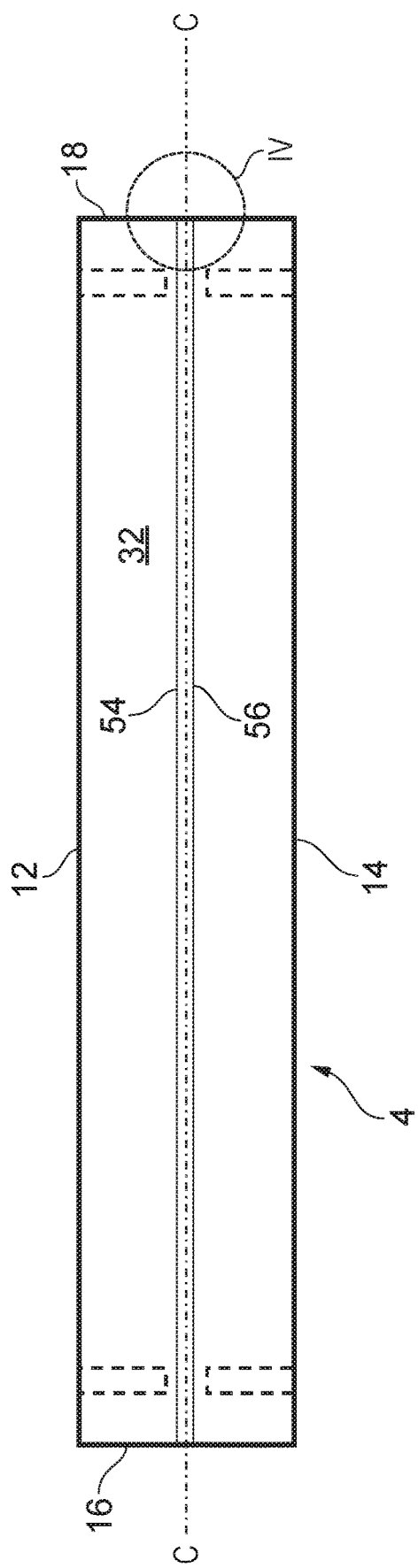
FIG. 3 is a underside plan view of the optical alignment bar of the jig of FIG. 1.
Figure 4:
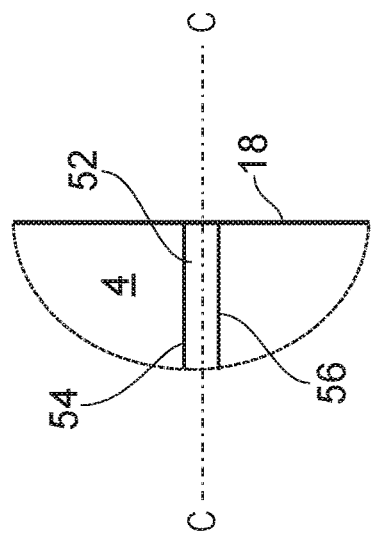
FIG. 4 is a partial view of the optical alignment bar of the area as indicated at IV in FIG. 3.
Figure 5:
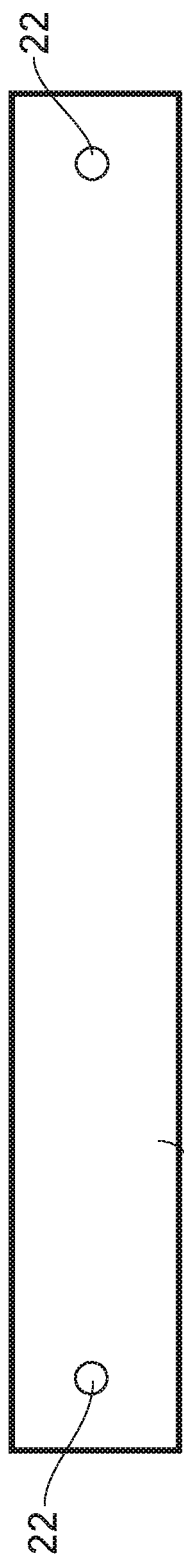
FIG. 5 is side plan view of a side plate of the jig of FIG. 1.
Figure 6:
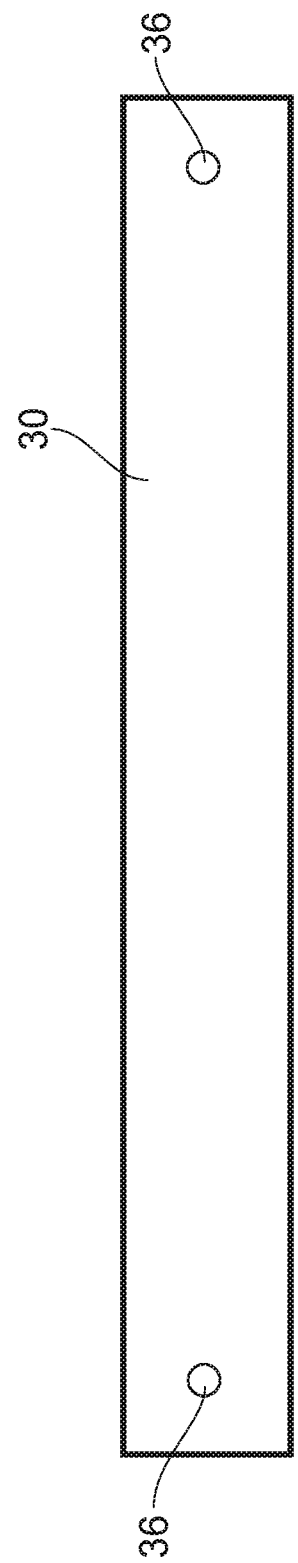
FIG. 6 is a side plan view of a shim in accordance with the present invention.

As indicated in FIG. 2, the routing jig 2 without shims, (i.e. an assembly of the optical alignment bar 4 and the side plates 6, 8 with no shims added), has a nominal width $W_n$, i.e. the nominal width $W_n$ is defined as the dimension of the routing jig 2, with no shims added, in the transverse direction.

Figure 7:
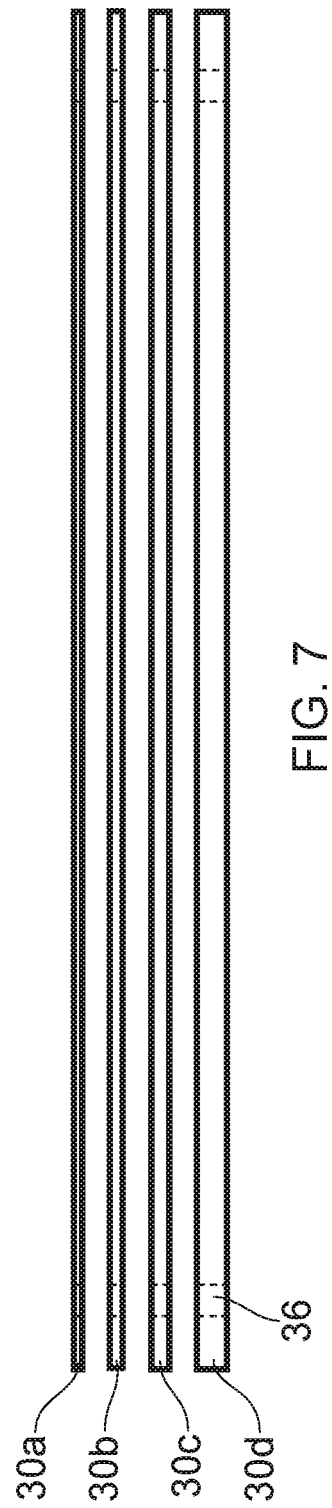
FIG. 7 is a top plan view of a set of shims in accordance with the present invention.
Figure 8:
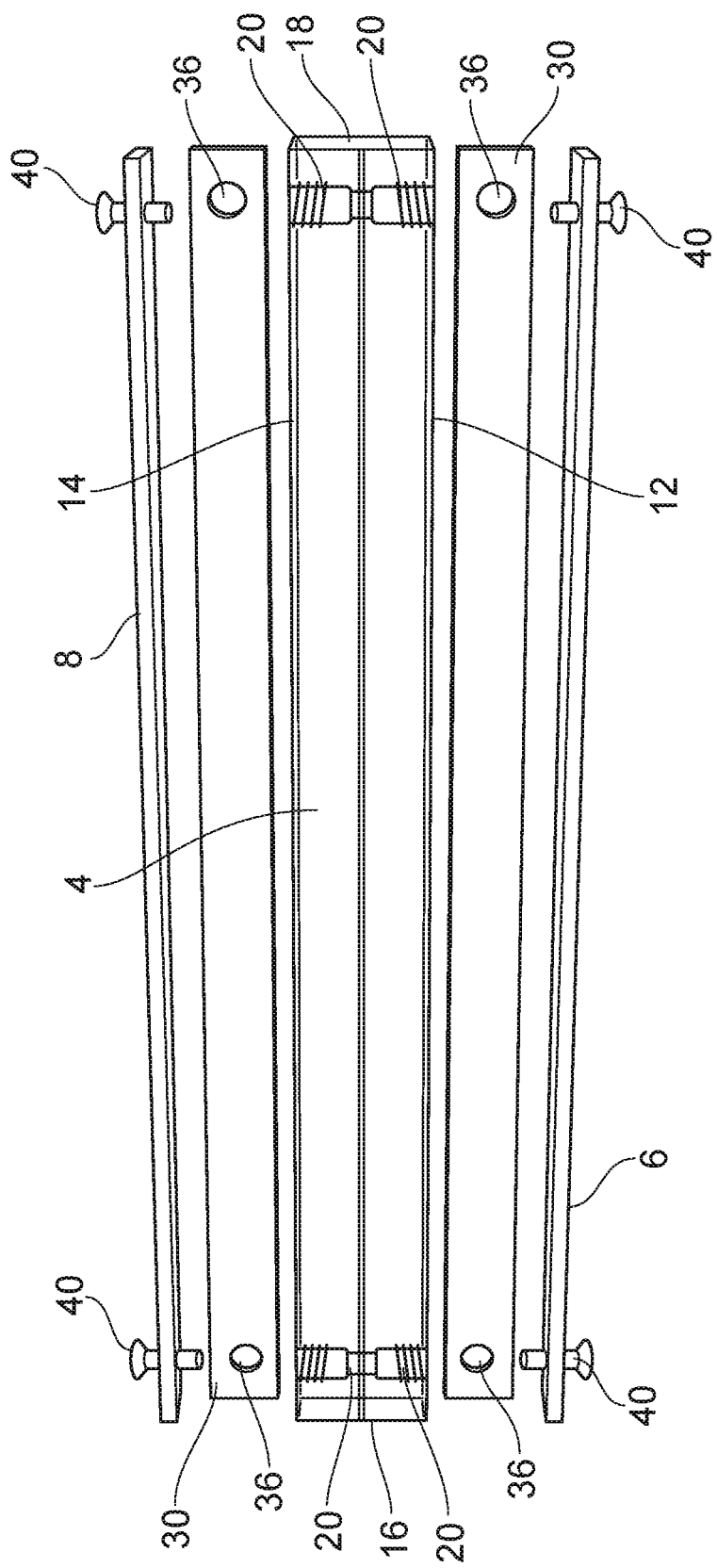
FIG. 8 is a disassembled view of the routing jig of FIG. 1 including one shim each side.

The plurality of shims 30 comprises a set of shims 30a, 30b, 30c, 30d etc., for example as shown in FIG. 7. The shims 30 are of different, known widths, i.e. different dimensions in the transverse direction. (The width of the shims 30a-30d has been exaggerated in FIG. 7 for illustrative purposes only). The shims 30 are coded, for example colour-coded or otherwise marked, to designate their respective widths. An example of a key for colour-coded shims is provided in FIG. 12.

The shims 30a, 30b, 30c, etc. are provided as a set, the set comprising at least a pair of each shim width, i.e. at least two shims are provided for each of the set widths.

Each of the shims 30 is provided with apertures 36, in a corresponding position to the apertures 22 of the side plates 6, 8 and the threaded inserts 20 of the optical alignment bar 4, enabling required shims 30 to be releasable secured between the optical alignment bar 4 and the side plates 6, 8.

The addition of one or more shims 30 to the routing jig 2 acts to increase the total width of the routing jig 2, i.e. to increase the dimension of the routing jig 2 in transverse direction, from the nominal width $W_n$ (indicated in FIG. 1), wherein $W_n$ is equal to the nominal diameter of the guide bush of the router which will be used. If the overall width of shims 30 added to the routing jig 2 (i.e. the overall width of shims added to both sides of the routing jig 2) is $W_s$, then the total width $W_t$, of the routing jig 2 in the transverse direction therefore becomes $W_n+W_s$.

The addition of an equal set of shims 30, i.e. a set of shims 30 having an equal total width in the transverse direction, to each side of the optical alignment bar 4, ensures that gap 52 between the two indication lines 54, 56 remains central with respect to the width of the routing jig 2 in the transverse direction.

The operation of the routing jig 2, to enable the machining of a feature 60 in a workpiece 100 using a router 115, will now be described.

Initially, a required machined feature width, $W_r$ (i.e. a required width of the feature 60 once machined into the workpiece 100), is determined, and an appropriate router bit (not shown) is selected and inserted into an appropriate router. The router bit which is selected is slightly undersize compared to the required machined feature width $W_r$.

As shown in FIG. 10a, router guides 200, such as guide rails or two straight pieces of timber, are then fixed, for example by clamping, onto a test piece 102 of workpiece (such as a scrap piece of workpiece), and an initial test cut 110 (FIG. 10b) is made by the router into the test piece. The test piece 102 is preferably of the same species as the workpiece 100 to be eventually machined (as machined features in certain materials, such as softwoods, can be prone to slight "close up" after machining).

After the initial test cut 110 has been made, an actual width $W_a$ of the test cut 110 is measured, for example using a pair of callipers or set-up/gauge blocks for greatest accuracy.

The routing jig 2 is then modified, by addition of selected shims 30, to compensate for the difference between the required feature width $W_r$ and the actual cut width $W_a$ in the test piece 102.

The required total shim thickness $W_s$ is defined by the difference between the required width $W_r$ of the machined feature, less the actual thickness $W_a$ of the initial test cut when machined into the test piece 102, i.e. $W_s=W_r-W_a$. However, as shims 30 are used in each side of the optical alignment bar 4, the required shim thickness for each longitudinal side of the optical alignment bar 4 is defined as:

Required total shim thickness each side=$(W_r-W_a)/2$

A selection, comprising one or more shims 30, is then determined to provide the required total shim thickness for each side. The provision of a range of shim widths enables an accurate selection of total shim width for each side.

The required width of machine feature $W_r$, and therefore the total width of shims required, will be dependent upon, for example, the required fit of a mating component to be inserted the final machined feature 60. For example, if a purely mechanical fit is required and no adhesive will be applied in the machined feature 60, the width of the machined feature 60 can be selected to be approximately equal to the width of the mating component. However, if adhesive is to be used when a mating component is assembled into a final machined feature 60, the selection of shims 30 may be adjusted to compensate for material effects of an adhesive on a workpiece 100. Whilst an epoxy resin glue may have minimal material effect on a workpiece, a water-based glue such as PVA may cause a workpiece to swell, and therefore the selected total width of shims 30 may be increased, to leave a predetermined clearance between the machined feature 60 and a mating component, i.e. to provide a looser fit of the mating component in the machined feature 60, to prevent difficulty in inserting the component into the final machined feature 60.

The determined selection of one or more shims 30, and the first side plate 6, are then assembled onto the first longitudinal side 12 of the routing jig 2, such that the selected shims are located between the first longitudinal side 12 of the optical alignment bar 4, and the first side plate 6. The first side plate 6 and shims 30 are then releasably secured to the optical alignment bar 4 by insertion of the screws 40, each screw 40 being inserted through a countersunk aperture 22 of the first side plate 6, through a corresponding aperture 36 of the or each shim 30, and into the corresponding threaded insert 20 in the optical alignment bar 4.

Similarly, an identical second selection of shims 30, and the second side plate 8, are assembled onto the second longitudinal side 14 of the optical alignment bar 4, and screws 40 are inserted in the same manner to retain the second set of selected shims 30 and the second side plate 8 in place on the routing jig 2.

During assembly of the selected shims 30 and side plates 6, 8 onto the routing jig 2, the screws 40 are tightened by hand, to avoid damage to the threaded inserts 20, and/or over-tightening which could result in distortion of the side plates 6, 8.

A further test cut 112 (FIG. 10c) can then be made in the test piece 102. The fit of a mating component (not shown) in the test cut 112 can then be tested by inserting the mating component into the test cut 112.

FIGS. 11a to 11e are schematic representations of a process for using the jig following the cutting of test cuts as above to produce a stopped groove or dado. Some detail has been omitted for clarity.

A centre line L of the feature to be machined is then indicated on the workpiece 100 (FIG. 11a). The centre line L could be indicated for example by scribing with a marking knife, or marking with a fine pencil (e.g. having a lead diameter of ≤0.5 mm).

The routing jig 2 is then positioned on the workpiece 100 (FIG. 11b) such that the lower surface 32 of the optical alignment bar 4 is in contact with the workpiece 100. The indication lines 54, 56 provided on the lower surface 32 are therefore immediately adjacent the workpiece 100 when the routing jig 2 is placed upon it.

Due to the transparent/semi-transparent material of the optical alignment bar 4, the user can then view, from the upper surface 32, the centre line L of the feature 60 to be machined, and also the indication means. The user aligns the centre line L of the feature 60 to be machined with the gap 52, i.e. such that the centre line L of the feature 60 to be machined lies in the gap 52 between the two indication lines 54, 56. In an embodiment having a width of gap 52 of 0.7 mm, and wherein the centre line L of the feature 60 to be machined was marked with a pencil having a 0.5 mm lead diameter, this would provide a 0.1 mm separation between the centre line L and each of the indication lines 54, 56.

As the gap 52 between two indication lines 54, 56, is central with respect to the width of the routing jig in the transverse direction, it is therefore ensured that a first side 24 and a second side 26 of the assembled routing jig 2 are equidistant from the centre line L of the feature 60 to be machined.

The ability of the user to view of indication means, and the centre line L of the feature 60 to be machined, through the optical alignment bar 4 ensures accuracy of placement of the routing jig 2 on the workpiece 100. Parallax error is avoided, because the indication means is immediately adjacent to the workpiece 100 to be machined. When a sufficiently narrow/fine scribed or marked feature centre line is provided on the workpiece to be machined, an accuracy of location of at least 0.05 mm is possible.

The router guides 200, such as guide rails or timbers, are then positioned on either side of, and abutting the routing jig 2 (FIG. 11c), and are secured in place, for example by clamping. The guides 200 are placed such that a first guide abuts the outer surface 24 of the first side plate 6 of the routing jig 2, and a second guide abuts an outer surface 26 of the second side plate 8. The countersinking of the screws 40 into the side plates 6, 8 (and the depth of the threaded inserts 20 in the optical alignment bar 4) ensures that the guides 200 can abut the outer surfaces 24, 26 of the assembled jig 2 in a flush manner.

The routing jig 2 is then removed, i.e. slid out from between the two guides 200 (FIG. 11d). The router is then used to machine the feature 60 into the workpiece 100 (the feature 60 after machining is illustrated in FIG. 11e), the path of the router being guided by the guides 200.

The router can be used to route the feature 60 by firstly keeping the router in contact with one guide, and then the other guide. It is preferable to maintain the rotational orientation of the router during routing, i.e. to not rotate the router. This avoids error in width of feature 60 which could be caused by guide bush/router bit eccentricity.

All routing is performed relative to the centre line L of the feature 60 which has been indicated on the workpiece 100, therefore the potential prior art problem of machining on the wrong side of an indicated line is avoided.

The use of the routing jig 2 of the present invention is now described with reference to a specific example. For a desired groove width $W_r$ of 19.05 mm (¾"), a router bit of 18 mm nominal diameter (i.e. slightly undersize compared to the desired groove width $W_r$) may be selected. When a groove is machined into a test piece of workpiece, the actual groove width $W_a$ is measured to be 18.3 mm wide.

The required shim thickness either side, is then calculated, using the above formula, (19.05 mm−18.3 mm)/2=0.375 mm (0.015").

To achieve a combined shim thickness each side of 0.375 mm (0.015"), a shim having a thickness of 0.254 mm (0.010") and a shim having a thickness of 0.127 mm (0.005") are combined. In the colour-coded shim kit illustrated in FIG. 12, one white and one brown shim would be used.

This selection of shims is then assembled between the optical alignment bar 4 and the first side plate 6, and an identical selection is assembled between the bar 4 and the side second plate 8, in accordance with the method above.

Before an initial use of the routing jig 2 of the present invention, a calibration process can be performed. The calibration process, which is only required to be performed once for a particular jig and router guide bush combination, ensures that the nominal width of the routing jig 2 is equal to the diameter of the guide bush of the router to be used. The calibration process enables compensation for dimensional differences, for example due to manufacturing tolerances on the router guide bush and/or the routing jig 2.

The router 115 and guide bush 116 which will be eventually used to machine a feature in a workpiece, are assembled by fitting the guide bush to the base plate (not shown) of the router. The guide bush is of an indicated diameter, for example an industry standard 30 mm diameter. The guide bush is then centred with a router spindle axis using a ground centering pin, centering cone, or, for the most accurate result, a Dial Test Indicator.

The routing jig 2 is then assembled without shims 30, i.e. by fastening the side plates 6, 8 directly to the longitudinal sides 12, 14 of the optical alignment bar 4, inserting and tightening the screws 40 (by hand only).

The routing jig 2 is then placed on a test piece, such as a scrap piece of workpiece, and two guides 200, such as clamp guides 200, or two pieces of straight timber (of equal thickness, greater than the depth than the guide bush), are positioned either side 24, 26 of the assembled routing jig 2. The guides 200 are placed in abutment with the sides 24, 26 of the routing jig 2, such that there is no discernible 'play' between the routing jig 2 and the guides 200.

Once the guides 200 have been secured in place on the test piece, for example by clamping, the routing jig 2 is then removed from the test piece, for example by sliding the jig 2 out from between the two guides 200, thereby leaving a 'slot' between the two guides 200.

The guide bush is then test fitted into the slot provided between the two guides 200. If the guide bush is a good slide fit in the slot, the calibration process is over, as the routing jig 2 has been calibrated as having a width, in the transverse direction, equal to the diameter of the guide bush.

If the fit of the guide bush in the slot between the two guides 200 is too tight, a shim 30 can be added to each side of the routing jig 2. This is done by disassembling the routing jig 2, by removing of the retaining means, i.e. unscrewing the screws 40 and removing the side plates 6, 8. A shim 30 is the assembled and between and secured between the optical alignment bar 4 and each side plate 6, 8 as described in the above method.

The guides 200 are then repositioned and re-clamped either side of the routing jig 2, the routing jig 2 once again removed to leave a slot having a width increased by the addition of shims 30 to the routing jig 2, and the fit of the guide bush of known diameter can then be retested in the slot between the two guides 200.

Shims 30 can be added to the routing jig 2, starting with the thinnest shims, until the guide bush is a good slide fit in the resulting slot between the two guides 200.

Once a good fit of the guide bush in the slot has been established, the routing jig 2 will then always be used with (at least) the shims 30 which have been added during the calibration process.

The routing jig 2 of the present invention can be supplied in various initial nominal widths. For example, a standard nominal width routing jig 2 would be supplied for use with a router fitted with an industry standard 30 mm guide bush. If a router having a larger diameter guide bush is to be used to machine a workpiece, a routing jig 2 having a greater nominal width would be used.

In the illustrated embodiments, the base component 1 comprises an optical alignment bar 4 formed wholly of a transparent or semi-transparent material. However in alternative embodiments, the optical alignment bar 4 may be formed partially of a transparent or semi-transparent material through which a user can view the indication means, a workpiece, and lines marked thereupon, and partially of an opaque material. For example, the optical alignment bar 4 could comprise a transparent/semi-transparent section, located centrally with respect to the width of the optical alignment bar in the transverse direction, with opaque sections either side. Furthermore, sections of the base component 1, such as a central transparent or semi-transparent section, could be recessed from surrounding sections.

In the embodiment described above, the indication means comprises two indication lines 54, 56 having a gap 52 therebetween. However, in an alternative embodiment, the indication means could comprise a single indication line which is engraved or applied to the lower surface 32 of the optical alignment bar 4 along a longitudinal central axis C of the lower surface 32, i.e. the single indication line extending centrally with respect to the longitudinal sides 12, 14 of the optical alignment bar 4. In this embodiment, the optical alignment bar 4 is placed on the workpiece 100 such that the single indication line is coincident with the centre line L of the feature 60 to be machined. Similarly to the embodiment described above, the addition of an equal set of shims 30, i.e. a set of shims 30 having an equal total width in the transverse direction, ensures the single indication line remains central with respect to the transverse width of the routing jig 2.

In the embodiment described above, the retaining means includes countersunk screws 40 which are insertable into countersunk apertures 22 in the sides plates 6, 8. However, in alternative embodiments, alternative retaining means could be provided. For example, the countersunk screws 40 could alternatively be cheesehead screws, and the countersunk apertures 22 in the side plates 6, 8 could alternatively be counterbored apertures. The depth of the counterbore of each aperture in the side plates 6, 8 (and the length of each of the threaded inserts 20 in the optical alignment bar 4), would be selected to ensure that the head of the cheesehead screw did not protrude out of the side plate once the jig 2 had been assembled, i.e. the screw heads would be flush with, or lower, than the outer surfaces 24, 26 of the assembled jig 2. Therefore, as in the above embodiment, on use of the jig 2, routing guides 200 could abut the outer surfaces 24, 26 of the jig 2 in a flush manner.

Other embodiments, which similarly ensure that routing guides could abut the outer surfaces 24, 26 of the assembled jig 2 in a flush manner, would also be possible.

In the above embodiment, the indication lines 54, 56 are discussed as being both entirely of the same colour. In alternative embodiments, the indication lines 54, 56 could be partially of one colour and partially of another colour, wherein sections of one colour of the first indication line 54 correspond with, i.e. are aligned longitudinally, with sections of the same colour of the second indication line 56.

For example, the indication lines 54, 56 could each be provided in a light colour such as white, from the centre of the optical alignment bar 4 to the first end 16, and in a dark colour such as black, from the centre of the optical alignment bar 4 to the second end 18. Alternatively, both indication lines 54, 56 could have dark-coloured sections of equal length extending from each end 16, 18 of the optical alignment bar, and a light coloured section therebetween. Such embodiments would enable the same optical alignment bar 4 to be used on different/opposing coloured workpieces.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A routing jig comprising;
   a base component having longitudinal sides, a lower surface and an upper surface and comprising an optical alignment bar at least partially formed of a transparent or semi-transparent material;
   retaining means, wherein the base component and the retaining means together define a nominal width of the routing jig in a transverse direction; and
   a plurality of shims, wherein the shims are selectively and removably securable to the longitudinal sides of the base component by the retaining means, thereby to increase the nominal width of the routing jig,
   wherein the retaining means comprises side plates, wherein a first side plate is releasably coupleable to a first longitudinal side of the base component, and a second side plate is releasably coupleable to a second longitudinal side of the base component, and wherein the shims are selectively and releasably attachable to the routing jig between the base component and each side plate.

2. The routing jig as claimed in claim 1 wherein the optical alignment bar comprises an indication means on the lower surface, wherein the indication means is visible through the upper surface of the optical alignment bar.

3. The routing jig as claimed in claim 2 wherein a central longitudinal axis is defined on the lower surface of the optical alignment bar,
   and wherein the indication means comprises an indication line which extends along the central longitudinal axis.

4. The routing jig as claimed in claim 2 wherein a central longitudinal axis is defined on the lower surface of the optical alignment bar;
   and wherein the indication means comprises a first indication line and a second indication line, wherein the first and second indication lines are parallel to the central longitudinal axis, and wherein the first indication line is defined on one side of the central longitudinal axis, and the second indication line is defined on the opposite side of the central longitudinal axis;
   and wherein the indication lines are each offset from the central longitudinal axis by an equal distance.

5. The routing jig as claimed in claim 4 wherein the first indication line and the second indication line are both coloured entirely in the same colour.

6. The routing jig as claimed in claim 4 wherein the first indication line and the second indication line each comprise one or more sections coloured in a first colour, and one or more sections coloured in a second colour;
   and wherein the sections of the first colour of the first indication line are longitudinally aligned with the sections of the first colour of the second indication line, and the sections of the second colour of the first indication line are longitudinally aligned with the sections of the second colour of the second indication line.

7. The routing jig as claimed in claim 1 wherein the retaining means further comprises either:
   countersunk screws which each extend through a countersunk aperture in a side plate and into the base component; or
   cheesehead screws which extend through a counterbored aperture in a side plate and into the base component.

8. The routing jig as claimed in claim 7 wherein the shims each comprise apertures through which the screws also extend.

9. A set of shims for use with the routing jig as claimed in claim 1, further comprising pairs of shims from said plurality of shims, each shim in a pair of shims having an identical width in the transverse direction.

10. A method of assembling the routing jig in accordance with claim 1, comprising;
    (i) locating a first selection of one or more shims of said plurality of shims against a first longitudinal side of the base component;
    (ii) locating a second selection of one or more shims of said plurality of shims against a second longitudinal side of the base component; and
    (iii) securing, by the retaining means, the first and second selections of one or more shims of said plurality of shims on the base component.

11. The method as claimed in claim 10 wherein the first selection and the second selection are identical in overall width in the transverse direction.

12. A method of removing material from a workpiece using a router to create a machined feature, the method comprising;
    (i) assembling the routing jig in accordance with the method of claim 10 to provide an assembled routing jig;
    (ii) positioning the the assembled routing jig on the workpiece such that the lower face of the assembled routing jig is in contact with the workpiece and the indication means is aligned with a central axis of a feature to be machined;
    (iii) positioning and securing a first guide to the workpiece such that the first guide abuts a first longitudinal side of the assembled routing jig;
    (iv) positioning and securing a second guide to the workpiece such that the second guide abuts a second longitudinal side of the assembled routing jig;
    (v) removing the assembled routing jig from between the first and second guides; and
    (vi) using the router to remove material from the workpiece between the guides.

13. The method as claimed in claim 12, comprising, prior to step (i) of assembling the routing jig;

(a) placing and securing the first and second guides to a test piece of workpiece;
(b) using the router to make a test cut in the test piece of workpiece;
(c) measuring a width, in the transverse direction, of the test cut;
(d) using the width measurement of the test cut to determine the first and second selection of shims to achieve a required total width of the machined feature.

14. A calibration process, which is performed prior to the method as claimed in claim 12, the calibration process comprising;
   (1) assembling the retaining means directly onto the longitudinal sides of the base component to provide an assembled routing jig;
   (2) positioning the assembled routing jig onto a test piece of workpiece such that the lower face of the assembled routing jig is in contact with the workpiece and the indication means is aligned with a central axis of a feature to be machined;
   (3) positioning and securing a first guide to the test piece of workpiece such that the first guide abuts a first longitudinal side of the assembled routing jig;
   (4) positioning and securing a second guide to the test piece of workpiece such that the second guide abuts a second longitudinal side of the assembled routing jig;
   (5) removing the assembled routing jig from between the first and second guide thereby leaving a slot between the first and second guides;
   (6) test fitting the router fitted with a guide bush having a known nominal diameter equal to the nominal width of the assembled routing jig into the slot; and
   if the guide bush is a good slide fit in the slot, determining that the calibration process is over; if the guide bush is not a good slide fit in the slot, removing the guides from the test piece, disassembling the assembled routing jig and reassembling with one or more shims secured to the routing jig, and repeating steps (2) to (6) until the guide bush is a good slide fit into the slot.

15. A routing jig comprising;
an optical alignment bar having first and second longitudinal sides, a lower surface and an upper surface, the optical alignment bar being at least partially formed of a transparent or semi-transparent material;
a first side plate releasably coupleable to the first longitudinal side of the optical alignment bar;
a second side plate releasably coupleable to the second longitudinal side of the optical alignment bar, wherein the optical alignment bar and the first and second side plates together define a nominal width of the routing jig in a transverse direction; and
a plurality of shims selectively and removably securable between the first side plate and the optical alignment bar and between the second side plate and the optical alignment bar, thereby selectively increasing a nominal width of the routing jig, wherein the plurality of shims comprises shims of different widths,
wherein the lower surface of the optical alignment bar comprises a gap such that a centre line of an object to be machined is visible through the upper surface and via the gap.

* * * * *